Nov. 30, 1954     L. R. EVANS     2,695,529
VARIABLE-SPEED TRANSMISSION MECHANISM
Filed Feb. 28, 1951     4 Sheets-Sheet 3

INVENTOR.
Leigh R. Evans
BY
Parker, Carman & Farmer,
Attorneys.

Nov. 30, 1954     L. R. EVANS     2,695,529
VARIABLE-SPEED TRANSMISSION MECHANISM
Filed Feb. 28, 1951     4 Sheets-Sheet 4

INVENTOR.
Leigh R. Evans
BY
Parker, Prochnow & Farmer,
Attorneys.

United States Patent Office 2,695,529
Patented Nov. 30, 1954

2,695,529

VARIABLE-SPEED TRANSMISSION MECHANISM

Leigh R. Evans, Elmira, N. Y., assignor to Hardinge Brothers, Inc., Elmira, N. Y.

Application February 28, 1951, Serial No. 213,259

6 Claims. (Cl. 74—230.17)

This invention relates to improvements in variable speed V-belt drives.

It has been customary in V-belt drives to provide between the driving and driven pulleys an idler pulley assembly connected by belts to driving and driven pulleys and including a belt-contacting member which is movable axially toward and from two other belt-contacting members in such a manner that when the movable belt-contacting member of the idler pulley is moved axially in one direction, the speed to the driven member will be increased and when moved in the opposite direction the speed to the driven member will be reduced. These prior devices do not operate with sufficient smoothness to render them usable on machines which are required to operate at high speeds and with a high degree of precision. This is particularly the case with lathes and other metal working machines designed to operate on work with tolerances of one or two tenths of a thousandth of an inch, in which vibrations of the driving motor or the change speed mechanism are reproduced in the work which is being operated on, thus making a high accuracy impossible.

One of the objects of this invention, consequently, is to provide a variable speed V-belt drive mechanism of this type with improvements which serve to overcome objections to the prior mechanisms, so that vibrations of the mechanism will be reduced or eliminated and so that vibrations of the parts will not be transmitted to the driven pulley.

The prior change speed mechanisms of this type also made no changes in the tension of the belts. A further object of this invention, consequently, is to provide a change speed mechanism in which the tension of the belts is automatically reduced when the speed of the driven belt is increased, and increased when the speed of driven belt is decreased.

Another object is to provide a mechanism of this type which can be readily adjusted to vary the belt tension at any speed.

A further object is to provide a drive mechanism of this type with an indicator of improved and simplified construction for indicating the speed of the driven pulley.

Other objects and advantages will be apparent from the following description of one embodiment of the invention and the novel features will be particularly pointed out hereinafter in connection with the appended claims.

Variable speed mechanisms embodying this invention may be applied to any suitable or desired type of machine, and in the accompanying drawing, by way of illustration, this improved drive is shown as used for driving a precision lathe.

In the drawings:

Fig. 7 is a central sectional plan view, on an enlarged scale, of the idler pulley employed in connection with the variable speed drive mechanism.

Fig. 8 is a longitudinal central sectional elevation of a dash pot of modified construction.

Fig. 9 is a transverse sectional elevation thereof, on line 9—9, Fig. 8.

Figure 1:
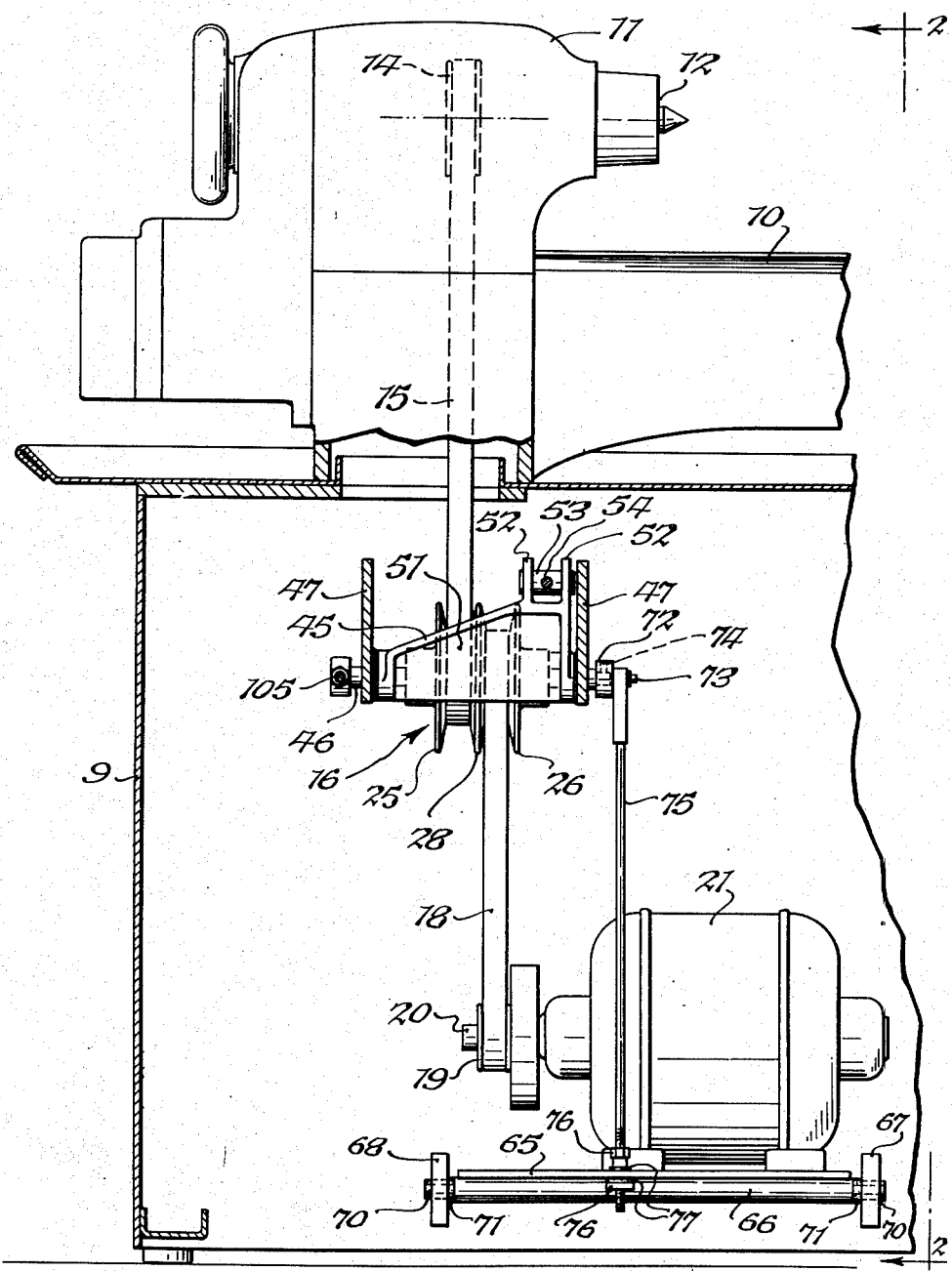
Fig. 1 is a fragmentary longitudinal elevation, partly in section, of a lathe provided with my improved variable speed drive, the section being taken approximately on the line 1—1, Fig. 2.

In the drawings, the variable speed mechanism is mounted in a base or pedestal 9 of a lathe, a portion only of which is shown. The lathe has a bed 10 mounted on the pedestal 9, and a headstock 11 provided with a spindle 12. Within the headstock is provided a driven pulley 14 mounted on the lathe spindle and cooperating with a V-belt 15 which receives power from an intermediate or idler pulley, generally designated at 16, and which receives power through another V-belt 18 from a pulley 19 mounted on the shaft 20 of a motor 21.

The intermediate pulley assembly with which the belts 15 and 18 cooperate includes two fixed belt engaging pulley members 25 and 26 which are suitably mounted to rotate about the axis of a shaft 27 and held against movement lengthwise of the shaft. The idler also includes the intermediate movable pulley member 28. This idler pulley assembly is shown more in detail in Fig. 7, in which it will be noted that the pulley assembly is mounted on a sleeve or hollow shaft 30 rotatably mounted about the stationary shaft 27. The fixed pulley 25 is provided with a hub 31 suitably secured, for example, by means of a threaded connection with the shaft 30 and a set screw 32, to the sleeve or hollow shaft 30 and a locking set screw 33 may be provided for holding the set screw 32 in place. The end of the set screw 32 preferably has a projection entering into an aperture in the sleeve to prevent rotation of the pulley member 25 relatively to the sleeve. A similar threaded connection and set screw 34 or other securing means may be provided for holding a hub 35 of the member 26 along the sleeve.

The pulley member 28 is movable lengthwise of the sleeve into various positions relatively to the two fixed pulley members 25 and 26, and may be provided with a hub 37 extending toward opposite sides of the belt engaging portion of this pulley member, and this hub may be provided in the bore thereof with a keyway 38 formed to cooperate with a key 39 seated in a suitable keyway in the sleeve 30. By means of this construction, the pulley member 28 may be readily moved axially into different positions toward and from the stationary pulley members 25 and 26, and will be rotated at the same speed as the pulley members 25 and 26. The keying of the movable pulley member to the sleeve 30 provides increased driving contact with the belts and materially reduces the risk of slippage and also reduces vibration of the intermediate pulley assembly.

The idler pulley may be rotatably mounted on the stationary shaft 27 in any suitable manner, for example, by means of ball bearings 40, the outer races of which are secured to the hubs 31 and 35 of the pulley members 25 and 26 and the inner races of which may be slidably mounted on the shaft 27. In the operation of this idler pulley, it will be obvious that if the tension of the belt 18 which operates between the pulley members 26 and 28 is decreased and the tension of the belt 15 which operates between the pulley members 25 and 28 is increased, then due to difference in pressures of these belts on the movable pulley member 28, this member will move to the right in Fig. 7, causing the belt 15 to cooperate with portions of the pulley members 25 and 28 of smaller diameter, for example, as shown in broken lines in this figure, while the belt 18 will cooperate with portions of the pulley members 26 and 28 of larger diameter, as also shown in broken lines in Fig. 7. If the belt 18 is the driven belt and is driven at a substantially constant speed, it will be obvious that the pulley assembly will be operated at a lower speed and the belt 15 will also operate at a lower speed, thus producing a lower speed of rotation of the driven pulley 14.

Figure 2:
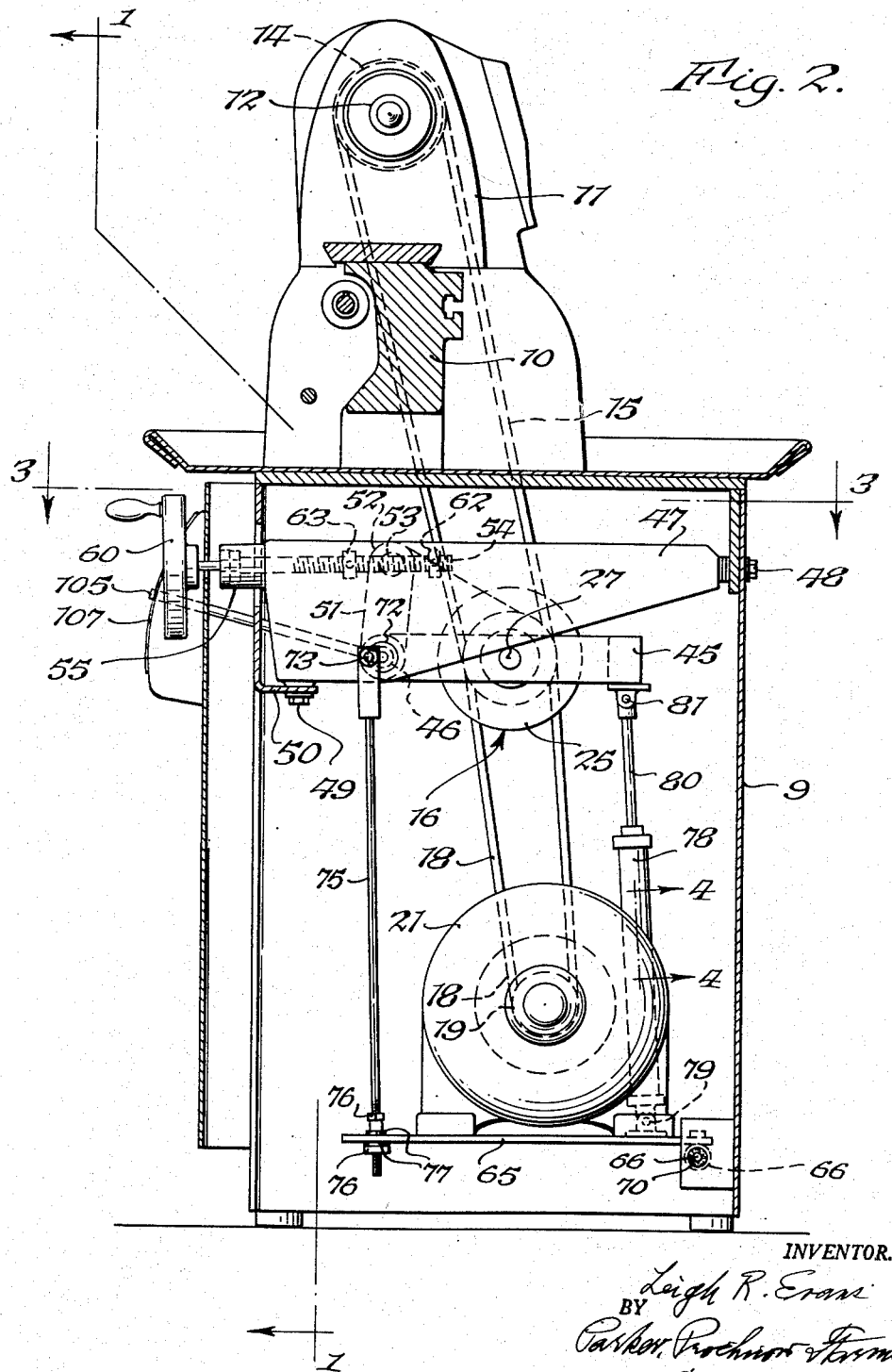
Fig. 2 is a transverse sectional elevation thereof, the section being taken on line 2—2, Fig. 1.
Figure 3:
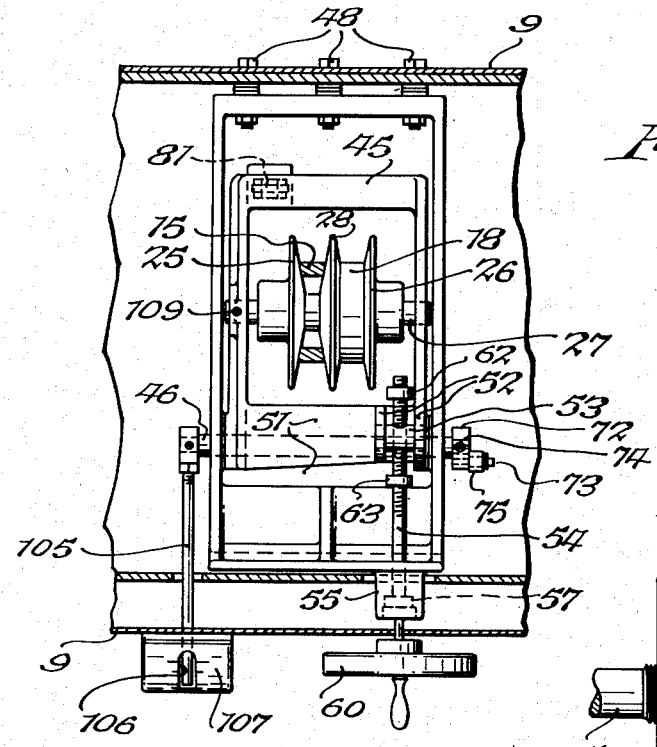
Fig. 3 is a fragmentary horizontal sectional view of the base of the lathe, on line 3—3, Fig. 2, showing a top plan view of the speed changing mechanism embodying this invention.

In the particular embodiment of this invention illustrated in the drawings, the variation in speed and in the position of the movable pulley member 28 is obtained by moving the idler pulley assembly toward and from the driving pulley 19 and driven pulley 14. This may be accomplished in any suitable or desired manner, and in the construction shown for this purpose, I have mounted the opposite ends of the countershaft 27 of the idler pulley on a bracket 45 which is mounted so that the portion thereof carrying the countershaft 27 may be moved toward and from the driving and driven pulleys 19 and 14. In the construction shown for this purpose, the countershaft bracket 45 has secured thereto a rocker shaft 46, the ends of which are pivoted on a rigid frame or supporting member 47. The ends of the supporting member or frame 47 are suitably secured in fixed position, for example, on the base or pedestal 9 of the machine. The frame member 47 shown in the drawings is of substantially hollow, rectangular form, one end of which is secured to the rear of the base or pedestal 9 by means of bolts 48, Figs. 2 and 3, and the other end of this frame member is mounted by means of bolts 49 on an inwardly extending flange 50 of the front wall of the base or pedestal. The countershaft bracket is mounted within the rectangular frame member 47.

The pivoted bracket 45 which is also of hollow rectangular form arranged within the frame member 47, has an upwardly extending portion or end wall 51 adjacent to the pivotal axis 46 of the countershaft bracket. This end wall is provided with a pair of upwardly extending arms 52 on which a short shaft 53 is pivotally mounted between the arms. This shaft has a transverse aperture which is threaded to receive a correspondingly threaded rod or shaft 54, Figs. 1, 3 and 6, which extends through a self-alining bearing of any usual and suitable construction, which is held against endwise movement in a hub portion 55 formed on the supporting frame or member 47 and which is shown in detail in Fig. 6. This bearing includes an outer race 56, the outer surface of which is of partly spherical form and which bears in an annular part 57 having an inner partly spherical surface formed to cooperate with the outer race 56. The bearing also includes an inner race 58 which is suitably secured to the shaft 54 and is pressed by a nut 59 against an annular shoulder formed on the shaft 54. The outer member 57 of the bearing is similarly secured against a shoulder formed in the hub portion 55 of the frame member 47. The operation of this bearing will be readily understood and it permits the shaft 54 to swing to compensate for the vertical component of the motion of the upwardly extending part or wall 51 of the bracket when the same is being adjusted about its pivot 46.

Figure 6:
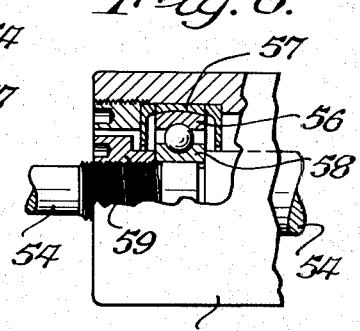
Fig. 6 is a sectional elevation, on an enlarged scale, showing a self-alining bearing for the speed adjusting shaft.

A self-alining bearing of the type shown in Fig. 6 can be accurately made so as to be free from end play, and consequently, when the shaft 54 is secured against lengthwise movement relatively to the frame member 47 by means of the self-alining bearing, vibrations of the bracket 45 are effectively opposed. The shaft 54 beyond the shoulder against which the self-alining bearing is held is of reduced diameter, and a hand wheel 60 is secured thereto, by means of which the screw shaft 54 may be turned. Consequently, by turning the hand wheel 60, the bracket 45 may be adjusted about its pivot shaft 46 in such manner as to move the idler pulley assembly in a substantially upright direction in Fig. 2, thus moving the idler pulley toward or from the driving pulley 19 and driven pulley 14. As before explained, this will result in axial movement of the pulley member 28 and thus effect changes in the speed at which the driven pulley 14 is rotated. In order to limit the extent to which the speed of the driven pulley may be varied, the screw shaft 54 is provided with adjustable collars or nuts 62 and 63, which may be pinned or otherwise secured to the screw shaft in fixed positions.

It will be obvious that when the screw shaft is turned so that either of the nuts or collars 62 or 63 engage with the short shaft 53, further turning of the screw shaft 54 in that direction will be stopped. Any other means may be provided for moving the countershaft bracket about its pivotal mounting.

By means of the construction shown a secure and rigid mounting for the intermediate pulley assembly results, since the shaft of the pulley assembly is supported at both ends thereof on the sides of the rectangular bracket 45. Consequently, there is no whipping of the pulley assembly as happens in cases where the pulley assembly is mounted on an overhanging end of a shaft. The rectangular frame member 47 also forms a secure and rigid support for the bracket so that when the bracket is adjusted in any desired position, it will be securely and rigidly held in such position, thus overcoming any tendency to vibrate or whip.

It is also desirable to provide means whereby the tension of the belts 15 and 18 will be reduced when the driven pulley 14 is operated at a high speed, and increased when the pulley 14 is driven at lower speeds. In order to accomplish this result I have shown by way of example an adjustable support on which the motor 21 is mounted, the support being adjustable to raise or lower the motor and thus provide the desired tension of the belts. In the construction shown for this purpose, the motor is mounted on a platform or support 65 which is mounted at one end on a shaft 66 on a stationary part of the base or pedestal of the machine. In the particular construction shown, the base or pedestal is provided with a pair of outwardly projecting brackets 67 and 68 in which the shaft 66 of the motor supporting platform is pivoted. In machines operating at a high degree of accuracy, it is desirable to cushion the vibrations of the countershaft bracket 45 and the motor to prevent these vibrations from being transmitted through the pedestal or base to the machine mounted thereon and which is being driven. In order to accomplish this result, the ends of the shaft 66, which are preferably of reduced diameter, are mounted in bushings 70, preferably made of rubber or a rubber-like material. These bushings are preferably provided with flanges 71 interposed between the brackets 67 and 68 and the shoulders formed on the ends of the shaft 66 by reducing the ends thereof. These flanges cushion any endwise movement of the shaft 66 and the motor supporting platform 65.

In order to automatically adjust this slack in accordance with the speed of the driven pulley 14, the shaft 46 which pivotally supports the countershaft bracket and which is secured thereto and pivoted to swing relatively to the supporting member 47, is provided at one end thereof with a wheel or disk 72 rigidly secured to the shaft 46, and this disk has a crank pin 73 eccentrically mounted thereon. Preferably the disk 72 is adjustably secured in any suitable manner to the shaft 46 by means of a set screw 74 so that the eccentric pin 73 may be positioned in various relations about the axis of the shaft 46.

The eccentric pin 73 is suitably connected by means of a link or rod 75 to the portion of the motor supporting platform 65 remote from the pivot shaft 66. For this purpose, the lower end of the connecting link 75 may be provided with nuts or collars 76 arranged above and below the motor supporting platform 65 and flanged rubber bushings 77 are provided which are arranged between the nuts 76 and the upper and lower faces of the motor supporting platform 65, so that transmission of vibrations between the countershaft bracket to the platform 65 will be avoided. When the resilient flanged bushings 77 and 70 are employed, the motor may be rigidly bolted to the motor support.

As a result of this construction, it will be obvious that as the countershaft bracket 45 is adjusted by means of the hand wheel 60, the shaft 72 secured to this bracket will also be turned to a corresponding extent, thus causing the eccentric pin 73 to move up and down in accordance with the adjustment of the hand wheel 60. The eccentric pin 73 is so mounted on the disk 72 that the adjustment of the bracket 45 by means of the hand wheel will produce corresponding vertical adjustment of the link 75.

The disk 72 may be adjusted to vary the amount of vertical throw or movement of the connecting link 75 and this may be done in any suitable or desired manner. For example, means may be provided for connecting the eccentric pin 73 at different distances from the axis of the shaft 27 to produce the desired movement of the connecting link 75, or the disk 72 may be replaced with another disk having the eccentric pin arranged at a different distance from the center of the disk. The disk 72 may be adjusted about the axis of the shaft 46 and secured in place by the set screw 74 so that the movement of the eccentric pin 73 may have a greater or less component of vertical movement and thus increase or reduce the extent to which the tension of the belts is affected by adjustment of the bracket 45 by means of the hand wheel 60.

It is well known that in pulley assemblies of the kind shown in detail in Fig. 7, the adjustment of the axially movable pulley member 28 toward and from the fixed pulley members 25 and 26 results in variations in the tension of the belts 15 and 18 cooperating with these pulley members. Consequently, by correctly securing the disk 72 about the axis of the shaft 46, the eccentric pin 73 may be positioned in such a manner that the vertical component of its movement about this axis will raise or lower the motor supporting platform so as to compensate for the variation in tension of the belts resulting from the adjustment of the movable pulley member 28 and also so that there will be more slack in the belts when operating at higher speeds and less slack when operating at lower speeds.

Figure 4:
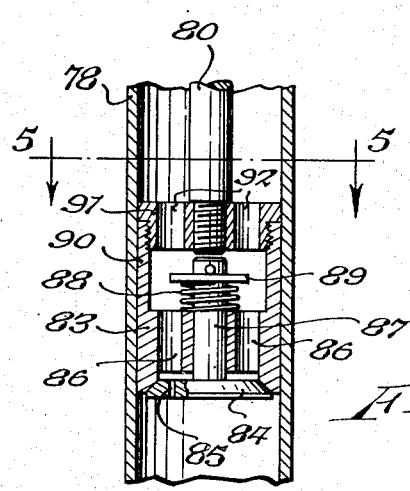
Fig. 4 is a fragmentary longitudinal central sectional elevation of a dash pot used in connection with the variable speed drive mechanism, the section being taken approximately on the line 4—4, Fig. 2.
Figure 5:
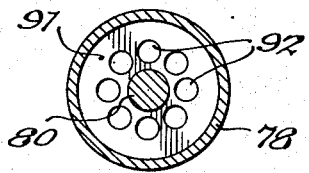
Fig. 5 is a transverse sectional elevation thereof, on line 5—5, Fig. 4.

When the intermediate pulley assembly is set by means of the hand wheel 60 to any desired speed, the movable pulley member 28 does not remain stationary at a fixed distance between the pulley members 25 and 26, but moves or vibrates axially to a limited extent. This action is known as "hunting" and produces a certain amount of vibration of the bracket 45. When a high degree of accuracy is required in the machine or apparatus driven by the change speed mechanism herein described, and particularly when operating at high speeds, it is necessary to eliminate or reduce to the maximum extent the transmission of these vibrations to the machine which is being driven. I have found that this can be effected by providing a dash pot or similar dampening device between the outer portion of the countershaft bracket 45 and the portion of the motor supporting platform 65 adjacent to the pivoted end thereof. In the particular construction shown for this purpose, this dash pot includes a cylinder 78 which, in the particular construction shown is pivoted at 79 to the motor platform 65. The dash pot also includes a piston rod 80 pivoted at 81 to the outer portion of the countershaft bracket 45. The plunger or piston of the dash pot may be of any suitable construction. One form of plunger or piston suitable for use in connection with this mechanism is shown in Figs. 4 and 5, in which 83 represents a piston having a sliding fit within the cylinder 78 and is provided at the lower end thereof with a valve seat on which a valve 84 may seat, the valve having a small bleeder port 85 therein. The body portion of the piston includes a plurality of apertures 86 through which liquid may pass. The valve has a stem 87 extending through a suitable aperture in the piston and is normally held in closed position by means of a spring 88 reacting against the upper face of the piston and a washer or disk 89 secured to the valve stem 87. The piston rod 80 may be secured to the piston in any desired manner, and in the construction shown in Figs. 4 and 5, the piston is provided with an upwardly extending skirt 90, the upper end of which is threaded for threaded engagement with a screw collar 91 to which the lower end of the piston rod is secured, for example, by means of a threaded connection between the piston rod and the collar 91. The collar is provided with apertures 92 through which fluid may pass.

In the operation of this dash pot, any sudden upward movement of the outer end of the countershaft bracket 45, such for example, as may be caused by sudden tension on the upper belt 15, is permitted, but retarded by the dash pot, since this will force the valve 84 into open position to permit fluid above the piston to flow through the apertures 92 and 86 past the valve 84. Downward movement of the outer end of the countershaft bracket 45 will be slow, since fluid in that case will have to pass through the small bleeder orifice 85. This orifice 85 also makes possible adjustment of the countershaft bracket 45 in either direction by turning the hand wheel 60.

Another type of piston for the dash pot is shown in Figs. 8 and 9, in which a piston 95 is provided having ports 96, 97 therein, the port 96 terminating in an enlarged downwardly extending portion formed with a valve seat at the lower end thereof with which a valve 98 cooperates. The stem 99 of the valve is urged into closed position by a coil spring 100 extending into an aperture in the piston. A bleeder passage or aperture 101 is provided in the piston which connects the lower face of the piston with the port 96. This dash pot operates in the same manner as the one shown in Figs. 4 and 5.

Any suitable or desired means may be provided for indicating the speed of the driven pulley 14, and in the construction provided for this purpose in connection with the mechanism shown in the drawings, a rod or pointer 105 is rigidly secured in any suitable manner to the rocker shaft 46 which is rigidly secured to the countershaft bracket 45. The rod extends outwardly through suitable slots or openings in the base or pedestal of the machine and terminates in a slot 106 provided on a calibrated arcuate plate 107 mounted on the outside of the front face of the base or pedestal 9. Since the speed of the driven pulley 14 is proportional to the amount of swing of the countershaft bracket 45 about the axis of the shaft 46, it will be obvious that the swing of the rod or pointer 105 will also be proportional to the speed of the pulley 14, and consequently, by providing a scale with suitable graduations on the front plate 107, the speed of the pulley 14 can be determined by noting the position of the outer end of the pointer 105 with reference to these graduations.

The structure described effectively dampens the vibrations which occur when the mechanism is operated at high speeds. By mounting the shaft 27 at both of its ends in the rigid rectangular countershaft bracket 45, there will be no vibrations such as result in the usual overhanging shaft on which the change speed pulleys were heretofore mounted. If it is necessary to remove or replace a belt, the countershaft 27 may be readily removed from the bracket 45 by swinging the bracket into a position in which the countershaft 27 will be below the frame member 47. This countershaft is held in place by means of a set screw 109 which can readily be released to permit the countershaft to be moved endwise out of the antifriction bearings 40 and thus permit the pulley assembly to be removed from the countershaft bracket. When the belt or belts have been replaced, the countershaft 27 is again inserted into the bearings 40 and then secured in place by means of the set screw 109.

Vibrations of the countershaft bracket are effectively dampened by means of the dash pot construction disclosed, and are prevented from being transmitted to the base or pedestal 9 of the machine by means of the bushings or washers of rubber or other resilient material which have been described. Mechanisms of this type have been successfully used on precision machines operating at speeds in excess of 4000 R. P. M. and the machines were found to operate at these speeds with the same degree of accuracy at which they operate at speeds below 1000 R. P. M. The mechanism has the further advantage that it is very easily adjustable to transmit large variations in speed the driven pulley 14.

By adjusting the belt tension in such manner that at high speed the belt tension may be decreased, a decrease in vibrations results, as well as less wear on the belt. However, the adjustability of the belt tension by changing the position of the disk or wheel 72 about the axis of the pivot shaft 27, enables the operator to vary the belt tension as best suited for the work which is being done.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A variable speed V-belt transmission including driving and driven pulleys, an intermediate pulley assembly including a pair of pulley members having belt engaging faces spaced apart in fixed relation to each other and an axially movable belt engaging pulley member arranged between the belt engaging faces of said fixed pulley members and movable toward and from said fixed members, belts cooperating with said driving and driven pulleys and with said fixed pulley members, each of said belts also engaging a side of said movable pulley member, a bracket on which said intermediate pulley assembly is journalled and which is movable toward and from said driving and driven pulleys, a driving motor having a shaft on which said driving pulley is mounted, a support on which said motor is mounted and which is movable toward and from said pulley assembly, and a connection between said bracket and said motor support for moving said support in accordance with movement of said bracket to adjust the tension of said belts in accordance with the speed of the driven pulley.

2. A variable speed V-belt transmission including driving and driven pulleys, an intermediate pulley assembly including a pair of pulley members having belt engaging faces spaced apart in fixed relation to each other and an axially movable belt engaging pulley member arranged between the belt engaging faces of said fixed pulley members and movable toward and from said fixed members, belts cooperating with said driving and driven pulleys and with said fixed pulley members, each of said belts also engaging a side of said movable pulley member, a bracket on which said intermediate pulley assembly is journalled and which is movable toward and from said driving and driven pulleys, a driving motor having a shaft on which said driving pulley is mounted, a support on which said motor is mounted and which is pivoted at one end thereof, a rod connected to the other end of said support and also connected with said bracket to swing said motor support toward said bracket when said bracket is swung in a direction to increase the sped of said driven pulley, to decrease the tension of said belts.

3. A variable speed V-belt transmission for a machine including a rotatable shaft and a pedestal on which the machine is mounted, said transmission including a driven pulley mounted on said shaft and a driving pulley, a motor mounted on a motor support having pivots at one end thereof about which said support may swing, a part on said pedestal on which said pivots are journalled, bushings of a rubber-like material interposed between said pivots and said part of said pedestal, an intermediate pulley assembly including a pair of pulley members having belt-engaging faces spaced apart in fixed relation to each other, and an axially movable belt contacting pulley member arranged between the belt engaging faces of said fixed pulley members and movable toward and from the same, belts cooperating with said driving and driven pulleys and with said fixed pulley members and each engaging a side of said movable pulley member, a bracket on which said intermediate pulley assembly is journalled and which is pivotally supported on said pedestal, said bracket when swung on its pivot moving said pulley assembly toward and from said driving and driven pulleys for varying the speed of said driven pulley, said driving pulley being mounted on the shaft of said motor, a crank mounted in eccentric relation to the pivot of said bracket, a rod connecting said crank and said motor support at a point remote from said pivot for swinging said motor support to move said motor toward and from said pulley assembly for varying the tension of said belts, and resilient bushings interposed between said rod and said motor support for preventing transmission of vibrations between said pedestal and said bracket.

4. A transmission according to claim 3 and including a dash pot connecting a portion of said bracket remote from its pivot with a part of said motor support adjacent to its pivotal connection with said pedestal.

5. A variable speed V-belt transmission including driving and driven pulleys, an intermediate pulley assembly including a pair of pulley members having belt engaging faces spaced apart in fixed relation to each other and an axially movable belt engaging pulley member arranged between the belt engaging faces of said fixed pulley members and movable toward and from said fixed members, belts cooperating with said driving and driven pulleys and with said fixed pulley members, each of said belts also engaging a side of said movable pulley member, a bracket on which said intermediate pulley assembly is journalled and which is movable toward and from said driving and driven pulleys, a driving motor having a shaft on which said driving pulley is mounted, a support on which said motor is mounted and which is pivoted at one end thereof, a rod connected to the other end of said support and also connected with said bracket to swing said motor support toward and from said bracket to vary the tension of said belts, and an adjustable connection between said bracket and said rod to vary the extent to which the belt tension is varied.

6. A variable speed V-belt transmission including driving and driven pulleys, an intermediate pulley assembly including a pair of pulley members having belt engaging faces spaced apart in fixed relation to each other and an axially movable belt engaging pulley member arranged between the belt engaging faces of said fixed pulley members and movable toward and from said fixed members, belts cooperating with said driving and driven pulleys and with said fixed pulley members, each of said belts also engaging a side of said movable pulley member, a bracket on which said intermediate pulley assembly is journalled and which has a shaft secured thereto in spaced relation to said pulley assembly, and which is pivoted on a fixed part of said transmission to enable said bracket to swing to move said pulley assembly toward and from said driving and driven pulleys, a crank pin mounted in eccentric relation to said shaft, a driving motor having a shaft on which said driven pulley is mounted, a support on which said motor is mounted and which is pivoted at one end thereof, a rod connected at one end to the other end of said support, the other end of said rod being pivoted on said crank pin, for varying the tension of the belts in accordance with the position of said bracket about the axis of said shaft.

References Cited in the file of this patent

UNITED STATES PATENTS

| Number | Name | Date |
|---|---|---|
| 2,066,560 | Evans | Jan. 5, 1937 |
| 2,131,247 | Winter | Sept. 27, 1938 |
| 2,157,758 | Jacobsen | May 9, 1939 |
| 2,186,477 | Coddington | Jan. 9, 1940 |
| 2,189,295 | Pfleger | Feb. 6, 1940 |
| 2,198,471 | Benson | Apr. 23, 1940 |
| 2,235,122 | Shaw | Mar. 18, 1941 |
| 2,237,511 | Tautz | Apr. 8, 1941 |
| 2,245,889 | Windle | June 17, 1941 |
| 2,258,776 | L'Hommidieu | Oct. 14, 1941 |
| 2,258,970 | Buettell | Oct. 14, 1941 |
| 2,546,856 | Frazier | Mar. 27, 1951 |
| 2,638,005 | King | May 12, 1953 |